Sept. 22, 1970
G. A. HALL, JR
3,529,802
MANUAL-AUTOMATIC TRANSFER DEVICE FOR PNEUMATIC CONTROL SYSTEMS
Filed Nov. 30, 1967
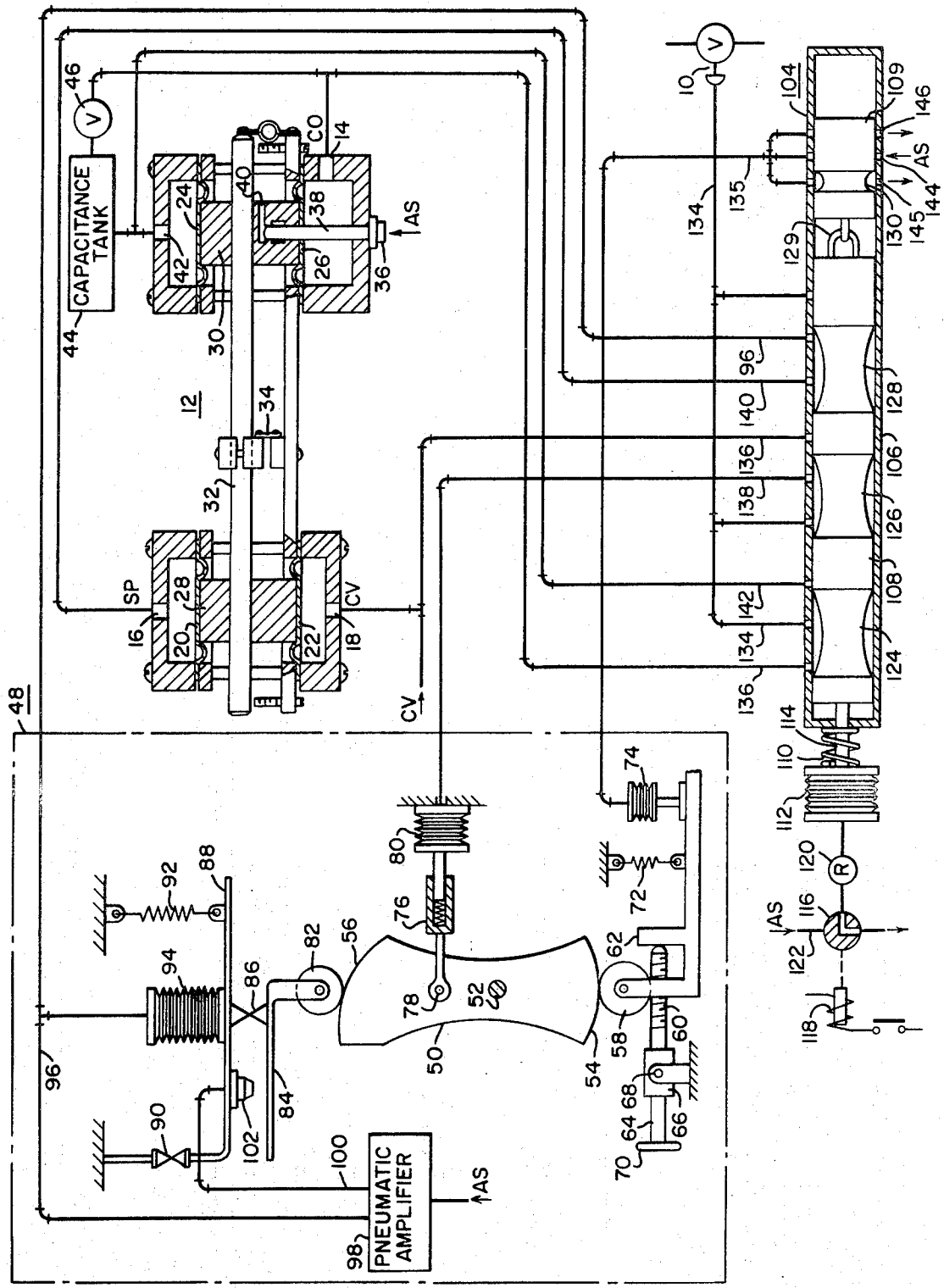
WITNESSES:
Bernard R. Gieguer
Leon M. Garman
INVENTOR
George A. Hall, Jr.
BY E. F. Possessky
ATTORNEY

United States Patent Office 3,529,802
Patented Sept. 22, 1970

3,529,802
MANUAL-AUTOMATIC TRANSFER DEVICE FOR PNEUMATIC CONTROL SYSTEMS
George A. Hall, Jr., Pittsburgh, Pa., assignor to Westinghouse Electric Corporation, Pittsburgh, Pa., a corporation of Pennsylvania
Filed Nov. 30, 1967, Ser. No. 686,989
Int. Cl. F16k 31/12
U.S. Cl. 251—26         9 Claims

ABSTRACT OF THE DISCLOSURE

A device provides smooth and "bumpless" transfer between automatic and manual control of a pneumatic regulating or control system. This is accomplished by means of a manual controller incorporating a bellows or the like responsive to the pressure applied to a control valve and arranged to match the applied incoming pressure with that in the control valve whenever a transfer is made from automatic to manual control or vice versa.

BACKGROUND OF THE INVENTION

While not limited thereto, the present invention is particularly adapted for use in control systems which provide automatic control of process variables, such as temperature, pressure, level, rate of fluid flow and many others in the processes and equipment of industries, laboratories, public works and the like. In such automatically-controlled plants, it is frequently necessary to transfer from manual control of the plant by the human operator to automatic control by the control system. Similarly, it is often necessary to transfer in reverse from automatic control to manual control. In such systems, it is very desirable to effect the transfer so as to produce no disturbance (i.e., "bump") in the condition of the final control element. For example, in the case of a pneumatically-actuated control valve, "bumpless" transfer requires no change in the control valve position; and this, in turn, requires transfer with no change in the air pressure being supplied to the control valve actuator.

In most pneumatic control systems presently available, such "bumpless" transfer requires three or more separate manipulations by the human operator, such as placing a transfer knob in balance position, turning a pressure regulator knob until the pressures on two pressure gages are brought to equilibrium, and thereafter effecting the actual transfer from manual to automatic or vice versa. These extra manipulations consume at least several seconds each and are prone to human error, especially on cascaded or ratio control systems. The time consumed by these extra manipulations is a serious handicap during operating emergencies, when up to dozens of control loops must be transferred to manual operation as fast as possible. Moreover, under emergency haste, the human operator is likely to make errors in these extra manipulations, resulting in severe disturbance to critical plant processes.

In the past, attempts have been made to provide manual-automatic transfer devices which facilitate "bumpless" transfer between automatic and manual control. However, such devices are complicated and expensive requiring a large number of calibration adjustments or involving continuously moving parts subject to wear and, in effect, are somewhat complicated to operate.

SUMMARY OF THE INVENTION

As an overall object, the present invention provides a manual-automatic transfer device for pneumatic control systems which permits instantaneous "bumpless" manual-automatic transfer at any time, by simply moving a single knob and without requiring any further attention or manipulation by the operator.

Another object of the invention is to provide a simple, manual-automatic transfer device of the type described which employs relatively inexpensive non-continuous moving, non-wearing components requiring essentially no calibration and providing long operatig life.

In accordance with the invention, a control system for a fluid-operated device is provided comprising means responsive to a source of fluid under pressure for automatically controlling the device as a function of a controlled variable pressure, means responsive to said source of fluid under pressure for controlling said device manually, a transfer valve for transferring control of said device from automatic to manual and vice versa, said transfer valve having a first position in which the device is connected to said automatic controlling means and a second position in which the device is connected to said manual controlling means, means including a pressure measuring mechanism operable when said transfer valve is in its first position for monitoring said controlled variable pressure, means including a pressure measuring mechanism operable when said transfer valve is in its first position for monitoring said controlled variable pressure, means including said pressure measuring mechanism for monitoring the actual pressure applied to said fluid-operated device when the transfer valve is in its second position, means operable upon movement of said tranfser valve from its first position to its second position to match the output pressure of said manual controlling means with that applied to the fluid-operated device, and means operable upon movement of the transfer valve from its second position back to its first position to match the output pressure of said automatic controlling means with that applied to the fluid-operated device.

As will be seen, the pressure matching operation occurs automatically as the transfer valve moves from one position to the other. This eliminates any necessity for further attention or adjustment by the human operator and simply requires that the transfer valve be initially actuated, whereupon the pressure matching operation takes place automatically.

The above and other objects and features of the invention will become apparent from the following detailed description taken in connection with the accompanying single figure drawing which schematically illustrates one embodiment of the invention.

With reference now to the drawing, the control system for a main control valve 10 incorporates an automatic controller, generally indicated by the reference numeral 12. This automatic controller may have various control actions; however, in the embodiment of the invention shown, it comprises a proportional plus integral action controller of the type manufactured by Hagan Controls Corporation, Pittsburgh, Pa., and described in their Product Bulletin PB–127–312. Essentially, the controller 12 comprises a pneumatically operated control mechanism for accurately combining input signal pressures and spring forces to produce a single signal pressure, this single output pressure being identified as CO at port 12. The output pressure represents the desired combination of the input signals which are identified as SP and CV. "SP" represents the set point pressure, or the pressure which represents the desired value of the controlled variable, and is applied to input port 16. The pressure identified as "CV" is the control variable derived from a measuring device on the system to be controlled and may represent a deviation from the desired set point pressure. As shown, the CV pressure is applied to input port 18.

The basic automatic controller assembly comprises four flexible non-metallic diaphragm pressure elements 20, 22, 24 and 26 arranged in opposing pairs. The two elements of each pair are attached to a common post. Thus, the diaphragms 20 and 22 are attached to the opposite ends of post 28; whereas diaphragms 24 and 26 are attached to the opposite ends of post 30. A beam 32 rotating about a flexible strip fulcrum 34 is connected between the two posts 28 and 30. A compressed air supply, AS to the device is supplied to input port 36. From port 36 it passes through a valve 38 and thence to the output port 14. Movements of the beam 32 are transmitted by direct contact to the end of the stem, not shown, of valve 38 which, as mentioned above, is interposed between inlet port 36 and outlet port 14.

Clockwise movements of the beam as shown in the drawing cause the valve 38 to open the inlet port, raising the output signal pressure at port 14. Counterclockwise beam movements cause the valve 38 to close the inlet port 36 and open an exhaust port 40, thereby reducing the output signal pressure at port 14. Further details of the operation of the valve 38 may be had by reference to the aforesaid Product Bulletin PB–127–312 of Hagan Controls Corporation. However, for purposes of the present application, it will suffice to say that as the beam 32 moves in a clockwise direction, the valve 38 tends to open; whereas when the beam 32 moves in a counterclockwise direction, the valve 38 closes, thereby disconnecting input port 36 from outlet port 14 and permitting air to escape through exhaust port 40.

When the resisting force due to the output signal pressure at port 14 balances the total of forces applied to the three input ports 16, 18 and 42, the pilot valve 38 closes both the inlet port 36 and the exhaust port 40, thus establishing a steady value of output signal pressure at port 14 as long as the balance of forces is undisturbed.

In order to produce integral (or "reset") control action, port 42 is connected through a capacitance tank 44 and a restricting valve 46 to outlet port 14. The purpose of this arrangement is to act upon the diaphragm 24 during automatic control of valve 10, whereby the controlled variable will be maintained at the desired value without offset or load error. However, during manual control of valve 10, this integral control action is by-passed by connecting the pressure in conduit 134 which is actuating valve 10 directly into port 43 by means of conduit 142 and port 124 of transfer valve 104. The purpose of this reset by-pass arrangement is to reduce the time constant of the RC network created by capacitance 44 and resistance 46 to zero during transfer from automatic to manual control, or vice versa.

The set point pressure SP applied to input port 16 is normally fixed during automatic control. If, under these circumstances, the control variable CV should increase in pressure, the beam 32 will be caused to rotate in a clockwise direction, thereby increasing the output pressure from port 14 until the control valve 10 is adjusted to a point where the set point pressure SP and control variable pressure CV are again matched. Similarly, if the control variable CV should decrease in pressure, the beam 32 will rotate in a counterclockwise direction, thereby reducing the output signal pressure 14 until the control valve 10 again causes the control variable CV to match the set point pressure SP.

The procedure just described occurs under automatic control of the control valve 10 wherein a servo system is established with the control variable CV being constantly matched to the set point pressure SP. However, under certain circumstances, it is necessary to transfer the system from automatic control to manual control; and if the pressure established by the manual setting does not exactly match that at the output of the controller 12, a transient condition or "bump" will occur when the system is transferred from automatic to manual control. The same condition, of course, can occur when the system is switched from manual to automatic control.

The device of the present invention for transferring from manual to automatic control or vice versa without any transient disturbance includes an automtaic bumpless transfer unit enclosed by broken lines and generally indicated by the reference numeral 48. It comprises a cam element 50 rotatable about a shaft 52 and having a lower arcuate cam surface 54 and an upper arcuate cam surface 56. Engaged with the lower arcuate cam surface 54 is a friction roller 58, faced with rubber, or the like. The roller 58, in turn, is engaged with a screw 60. Both the roller 58 and screw 60 are carried on a frame 62. The screw 60 is connected to a shaft 64 which passes through a bearing 66 pivotally connected to a support as at 68. At the end of the shaft 64 oposite screw 60 is a control knob 70 which may be rotated or adjusted manually by a human operator.

The entire assembly of elements just described can, of course, rotate about the pivot point 68. Normally, the friction roller 58 is held in engagement with the cam surface 54 by means of a tension spring 72; however, it may be selectively released from the cam surface when a bellows 74 is pressurized, thereby causing the frame 62 and roller 58 to rotate in a clockwise direction about pivot point 68.

Connected to the cam 50 above the shaft 52 is a spring-loaded lost-motion linkage 76 having one end pivotally connected to a pneumatic bellows 80. With the arrangement shown, and assuming that the friction roller 58 is held in engagement with the cam surface 54, motion of the bellows 80 cannot cause the cam 50 to move. Rather, any expansion or contraction in the bellows 80 caused by a pressure change therein will be absorbed by the lost-motion linkage 76 until bellows 74 is presurized to disengage the roller 58 from the cam 50, whereupon the cam will assume the position dictated by the pressure within bellows 80.

Engaged with the upper cam surface 56 is a second roller 82 carried at one end of a vane 84. The vane 84, in turn, is connected through a flexure joint 86 to a beam 88 which is suspended at one end by means of a flexure joint 90 and at its other end by means of a tension spring 92. Between the flexure joint 90 and spring 92 is a bellows 94 having its input connected to a conduit 96. As shown, the conduit 96 is connected to the output of a pneumatic amplifier 98 to which a source of air under pressure, AS, is connected. The amplifier 98 is also connected through conduit 100 to a jet 102 carried on the beam 88, the arrangement being such that the back pressure from the jet 102 will be a function of the distance between the lower vane 84 and the beam 88. This distance, in turn, will be a function of the rotational position of cam 50 and cam follower roller 82, as will be understood. As the relationship of vane 84 with respect to beam 88 changes and the back pressure in conduit 100 also changes, the ouput pressure in conduit 96 will vary.

In order to switch from manual to automatic operation or vice versa, a transfer valve, generally indicated by the reference numeral 104, is provided. The transfer valve may take various forms; however in the embodiment of the invention shown it comprises an outer cylinder 106 having a cylindrical valve element 108 reciprocal therein. The valve element 108 is normally urged to the left as viewed in the drawing by means of a coil spring 110; however it may be forced to the right against the resistance of spring 110 by means of a pneumatic bellows 112 connected to the valve element 108 through piston rod 114. The bellows 112 is operated by means of a valve 116 which, in the position shown, connects the bellows to the atmosphere. However, upon electrical energization of solenoid 118, the position of the valve 116 will be reversed to connect the bellows through restrictor 120 to port 122 which is connected to a source as of air under pressure. As will be understood, the restrictor 120 acts as a resistance to air flow and causes the bellows 112 to move the plunger 108 to the right in a more or less gradual manner.

The transfer valve member 108 has a number of reduced diameter portions or ports identified by the numerals 124, 126, 128 and 130. In the position of the transfer valve which is shown, conduit 134 leading to the actuator for control valve 10 will be connected by port 124 of transfer valve 104 to conduit 136 which is, in turn, connected to the output port 14 of the proportional plus integral controller 12. Under these circumstances, automatic operation exists with the valve 10 being controlled by the proportional plus integral controller 12. That is, the position of valve 10 will be changed automatically as the control variable CV changes. The conduit 135 connected to bellows 74 is connected to atmosphere through port 145 at this time by port 130 of transfer valve 104; while the control valve conduit 134 is connected through transfer valve port 126 and conduit 138 to the bellow 80. During automatic operation, the cam 50 is locked in place since the friction roller 58 is in engagement with cam surface 54. Nevertheless, expansion or contraction of the bellows 80 due to changes in the control valve pressure in conduit 134 will be reflected in the spring-loaded lost-motion linkage 76. Finally, conduit 140 connected to the set point pressure input port 16 of the controller 12 is connected by port 128 of transfer valve 104 to conduit 96 which is, in turn connected to the output of amplifier 98.

Under the automatic control condition as shown, the set point pressure applied to port 16 of the automatic controller 12 can be varied to any desired value by manually rotating the knob 70, thereby rotating roller 58 and cam 50 about shaft 52. As the cam 50 is rotated, the distance between the vane 84 and jet 102 will vary, thereby varying the ouput pressure to the controller set point port 16 through conduit 140. As the output pressure of amplifier 98 is thus changed, the bellows 94 will be caused to expand or retract, depending upon whether the pressure increases or decreases. Assume, for example, that the vane 84 moves downwardly. This causes the pressure in conduit 96 to increase and the bellows 94 to expand. This will cause the nozzle 102 to move downwardly toward the now lowered vane 84 until an equilibrium condition is again reached. In this respect, it can be appreciated that the bellows 94 provides a servo loop within the automatic bumpless transfer unit itself.

If it is now desired to switch from automatic control to manual control, the solenoid 118 is energized, thereby connecting the bellows 112 to fluid under pressure. Under these circumstances, the valve member 108 begins to move to the right as viewed in the drawing. Firstly, as it moves to the right, conduit 134 is first disconnected from conduit 136 and conduit 134 then becomes connected to conduit 142. Therefore, any subsequent pressure changes applied to the control valve 10 also are applied directly to input port 42 on the controller 12 such that the controller immediately will follow or "track" the pressure established on the valve 10 even though automatic control is not in effect. Secondly, as the valve member 108 continues its rightward movement, the reduced diameter portion 130 will move to a point where conduit 135 is disconnected from atmospheric port 145 and then is connected to port 144 which is, in turn, connected to a source of air under pressure. Continued rightward movement of the valve element 108 will again connect conduit 135 to the atmosphere via port 146. The effect of this, of course, is momentarily to pressurize the bellows 74 whereby the member 62 and roller 58 are moved downwardly and momentarily out of engagement with the cam surface 54. When this occurs, the cam 50 will be rotated to the position dictated by the pressure within bellows 80 via the lost-motion linkage 76. Since, at this time, the pressure within bellows 80 is dependent upon the pressure to the control valve 10, the position of the cam 50 will be a function of this control valve pressure. If the pressure applied to bellows 80 is equal to the control valve pressure then the output pressure of amplifier 98 in the automatic bumpless transfer unit 48 will now be equal to the pressure previously existing on valve 10 during the automatic control condition.

Thirdly, as transfer valve member 108 continues its rightward motion, transfer valve port 126 first disconnects conduit 138 leading to bellows 80 from the control valve pressure in conduit 134 and then reconnects bellows 80 to the controlled variable pressure CV in conduit 136.

Finally, as valve member 108 continues to move to the right, conduit 96 will first be disconnected from set point conduit 140 and then be connected to conduit 134 by transfer valve port 128 and, hence, to the main control valve 10; and it can be appreciated that transfer has occurred from automatic to manual operation without changing the pressure on the valve 10 and causing any transient disturbances to its position. That is, since the pressure in conduit 96 had automatically been preadjusted to equal that on the valve 10 due to movement of cam 50 when roller 58 was momentarily disengaged therefrom, the two pressures match and a "bumpless" transfer occurs.

Under the manual-control condition which now exists, the human operator can remotely control the position of control valve 10 by manually turning the knob 70. Turning knob 70 causes the output pressure from automatic bumpless transfer unit 48 to vary as was described above.

Let us assume, now that it is desired to transfer from manual control back to automatic control. Under these conditions, the solenoid 118 will be deenergized whereby the bellows 112 is again connected through restriction 120 and valve 116 to the atmosphere. Under these circumstances, spring 110 causes the transfer valve member 108 to move to the left as viewed in the drawing in a more or less gradual manner due to resistance to air flow offered by restriction 120. The first operation which occurs during leftward movement is the disconnecting of conduit 96 from conduit 134 and the reconnecting of it to conduit 140 whereby the set point pressure input port 16 is again connected to the output of the automatic bumpless transfer unit 48.

Secondly, conduit 135 is connected momentarily to port 144 whereby bellows 74 is expanded to again disengage roller 58 momentarily from cam 50 whereby the lost-motion linkage 76 can adjust the cam 50 as dictated by the control variable pressure CV.

Under these conditions while roller 58 is momentarily disengaged from cam 50 the automatic bumpless transfer unit 48 will bring its output pressure in conduit 96 equal to the controlled variable pressure CV connected to bellows 80. Since the set point pressure at port 16 of automatic controller 12 now equals the controlled variable pressure at port 18, the sum of forces due to SP and CV pressures is zero. Therefore, to maintain a force balance equilibrium around fulcrum 34, the automatic controller must bring its output pressure at port 14 equal to the control valve pressure being applied to controller port 42 through bypass conduit 142.

Thirdly, as element 108 continues its leftward motion port 126 first disconnects measuring bellows conduit 138 from CV conduit 136 and next connects it to control valve pressure conduit 134. Finally, conduit 134 is disconnected from reset bypass conduit 142 and reconnected to conduit 136 by transfer valve port 124, whereby control valve 10 is connected to the output ports 14 of the automatic controller 12 reestablishing automatic control. Therefore, since the controller output pressure was brought equal to the control valve pressure before they were connected, bumpless transfer from manual to automatic control occurs when the two pressures are interconnected by transfer valve port 124. It can be appreciated that transfer has occurred from manual to automatic operation without changing the pressure on control valve 10, nor causing any transient disturbance to its position.

Note in the above described transfer from automatic to manual control and vice versa, that the sequence in which transfer valve ports act as valve element 108 moves to the left as viewed in the drawing is not the exact reverse order of the port actions as element 108 moves to the right. During automatic to manual transfer as element 108 moves rightward, the sequence of actions is first by port 124, second by port 130, third by port 126 and fourth by port 128. However, during manual to automatic transfer as element 108 moves leftward, the sequence of valve actions is first by port 128, second by port 130, third by port 126 and 4th by port 124. It is seen that port 130 is second in action whether element 108 is moving right or moving left. This change in sequence of port 130 is necessary to the proper operation of the automatic bumpless transfer unit 48, and is accomplished by the lost-motion linkage 129 which connects cylindrical transfer valve element 108 with like element 109, which carries in it port 130. When element 108 begins rightward motion from its first or automatic position, element 109 is not moved until element 108 has travelled a distance sufficient to open the lost-motion gap of the lost motion linkage 129. Thereafter, until the end of the rightward stroke, element 108 and element 109 will move rightward together as one unit. Conversely, when valve element 108 begins leftward motion from its second or manual position, element 109 is not moved until element 108 has travelled a distance sufficient to close the lost motion gap of linkage 129. By proper dimensioning of the lost-motion gap and of the distance between the several ports of the transfer valve, action of port 130 can be made to follow after the action of port 124 on the rightward stroke and after the action of port 128 on the leftward stroke.

It can be seen, therefore, that the present invention provides an automatic means requiring no adjustments or manipulations by a human operator for shifting from automatic to manual control in a pneumatic system while maintaining the pressure in the control element constant whereby no transients occur during the transfer from automatic to manual or vice versa. Although the invention has been shown in connection with a certain specific embodiment, it will be readily apparent to those skilled in the art that various changes in form and arrangement of parts may be made to suit requirements without departing from the spirit and scope of the invention.

What is claimed is:

1. In apparatus for controlling a fluid-operated device, the combination of means connected to a source of fluid under pressure for automatically controlling said device as a function of a controlled variable pressure, means for controlling said device manually, a valve for transferring control of said device from automatic to manual and vice versa, said valve having a first position in which the device is connected to said automatic controlling means and a second position in which the device is connected to said manual controlling means, means including a pressure measuring mechanism and a cam-operated device connected to the pressure measuring mechanism through a lost-motion linkage for monitoring the actual pressure applied to said device only when said valve is in its first position, said monitoring means monitoring said controlled variable pressure only when said valve is in its second position, means connected to said monitoring means and operable upon movement of said valve from its first position to its second position for automatically matching the output pressure of said manual controlling means with that applied to the fluid-operated device, and means connected to said monitoring means and operable upon movement of said valve from its second position to its first position for automatically matching the output pressure of said automatic controlling means with that applied to the fluid-operated device.

2. The apparatus of claim 1 wherein said means for controlling said device manually includes a cam in said cam-operated device having opposed arcuate cam surfaces rotatable about a common axis, a manually rotatable roller in engagement with one of said surfaces, a pivotally supported vane having a cam follower at one end in engagement with the other of said surfaces, nozzle means for directing fluid under pressure against the other end of said vane, means for deriving an output pressure which is a function of the distance between said nozzle means and the vane, and conduit means for applying said output pressure to said fluid-operated device when the valve is in its second position.

3. The apparatus of claim 2 including conduit means for applying said output pressure to said automatic controlling means when said valve is in its first position.

4. The apparatus of claim 2 wherein the vane is pivotally supported on a beam by means of a first flexure joint, the beam being supported at one end by a second flexure joint and at its other end by a tension spring, and a bellows connected to said conduit means and responsive to said output pressure for moving the beam toward said vane when the distance between the vane and the beam increases.

5. The combination of claim 2 and including pressure actuated means operable in response to movement of said valve from its first position to its second position and also operable upon movement of the valve from its second position to its first position to disengage said manually rotatable roller from said one surface of the cam.

6. The apparatus of claim 5 wherein movement of said valve from its first position to its second position initially disconnects said fluid-operated device from the output controlling pressure of said automatic controlling device, thereafter pressurizes said pressure actuated means for disengaging said manually rotatable roller from said one surface of said cam, thereafter disconnects said pressure measuring mechanism in the monitoring device from the input to said fluid-operated device and connects it to said controlled variable pressure, and finally disconnects said means for automatically controlling said output pressure and connects said output pressure to said fluid-operated device.

7. The apparatus of claim 5 wherein movement of said valve from its second position to its first position initially disconnects said fluid-operated device from said output pressure of the manual controlling, thereafter pressurizes said pressure actuated means for disengaging said manually rotatable roller from said one surface of said cam; thereafter disconnects said pressure measuring mechanism in said monitoring means from said controlled variable pressure and connects said pressure measuring mechanism in the monitoring means to the actual pressure applied to said fluid-operated device, and finally connects the output controlling pressure of said automatic controlling means to said fluid pressure operated device.

8. The apparatus of claim 6 wherein said valve comprises a cylinder having cylindrical valve members reciprocable therein, the valve members having reduced diameter portions along their lengths, spring means for urging said cylindrical valve members in one direction, and fluid-operated means for moving said cylindrical valve members in the opposite direction.

9. The apparatus of claim 6 wherein said valve includes a lost-motion means whereby the sequence of actions of the reduced diameter portions of the cylindrical members is alterable as between motion of the said valve from its first position to its second position and from its second position to its first position.

References Cited

UNITED STATES PATENTS

| | | | |
|---|---|---|---|
| 2,939,472 | 6/1960 | Eller | 137—82 |
| 2,666,585 | 1/1954 | Gess | 137—82 |
| 2,731,023 | 1/1956 | Panich et al. | 137—82 |
| 2,935,077 | 5/1960 | Keyser | 137—82 |
| 3,208,465 | 9/1965 | Virbila | 137—85 |

ARNOLD ROSENTHAL, Primary Examiner

U.S. Cl. X.R.

137—86